United States Patent
Kawashiri et al.

(10) Patent No.: US 12,498,233 B2
(45) Date of Patent: Dec. 16, 2025

(54) INFORMATION PROCESSING APPARATUS

(71) Applicant: SUBARU CORPORATION, Tokyo (JP)

(72) Inventors: Takahiro Kawashiri, Tokyo (JP); Tong Wang, Tokyo (JP); Hiroyuki Akiyama, Tokyo (JP); Go Yanagisawa, Tokyo (JP); Shotaro Suzuki, Tokyo (JP); Yoshitsugu Inoue, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 44 days.

(21) Appl. No.: 18/594,108

(22) Filed: Mar. 4, 2024

(65) Prior Publication Data
US 2024/0328799 A1 Oct. 3, 2024

(30) Foreign Application Priority Data
Mar. 27, 2023 (JP) ................................ 2023-049256

(51) Int. Cl.
*G01C 21/34* (2006.01)
*B60L 58/13* (2019.01)
(Continued)

(52) U.S. Cl.
CPC .......... *G01C 21/3469* (2013.01); *B60L 58/13* (2019.02); *B60W 50/0097* (2013.01); *B60W 50/14* (2013.01); *G01C 21/3492* (2013.01); *G01C 21/3691* (2013.01); *B60L 2240/66* (2013.01); *B60L 2240/68* (2013.01);
(Continued)

(58) Field of Classification Search
CPC .......... B60W 30/18163; B60W 30/09; B60W 30/0956; B60W 2554/80; B60W 2554/20; B60W 2554/4042; B60W 2554/801; B60W 2554/802; B60W 2554/804; B60W 30/12
See application file for complete search history.

(56) References Cited

U.S. PATENT DOCUMENTS

2022/0396176 A1* 12/2022 Baudisch ............ H01M 10/486

FOREIGN PATENT DOCUMENTS

JP 2020-126058 A 8/2020

* cited by examiner

*Primary Examiner* — Lindsay M Low
*Assistant Examiner* — Charles J Brauch
(74) *Attorney, Agent, or Firm* — TROUTMAN PEPPER LOCKE LLP

(57) ABSTRACT

An information processing apparatus includes one or more processors and one or more storage media storing a program. The program includes one or more instructions that cause the one or more processors to execute acquiring information on a current location of a vehicle and a destination of the vehicle; acquiring one or more scheduled travel routes for reaching the destination from the current location; acquiring current weather information; predicting a standstill section in which a standstill situation is likely to occur on the one or more scheduled travel routes; predicting a standstill time during which a standstill situation occurs in the predicted standstill section; calculating heating power consumption due to use of heating over the predicted standstill time; performing a determination as to whether to additionally charge a traveling battery of the vehicle in accordance with the heating power consumption; and presenting information corresponding to a result of the determination.

11 Claims, 8 Drawing Sheets

(51) Int. Cl.
  *B60W 50/00*   (2006.01)
  *B60W 50/14*   (2020.01)
  *G01C 21/36*   (2006.01)
(52) U.S. Cl.
  CPC ....... *B60L 2250/16* (2013.01); *B60L 2260/54* (2013.01); *B60W 2050/146* (2013.01); *B60W 2510/244* (2013.01); *B60W 2554/406* (2020.02); *B60W 2555/20* (2020.02); *B60W 2556/10* (2020.02)

INFORMATION PROCESSING APPARATUS

CROSS-REFERENCE TO RELATED APPLICATION

The present application claims priority from Japanese Patent Application No. 2023-049256 filed on Mar. 27, 2023, the entire contents of which are hereby incorporated by reference.

BACKGROUND

The disclosure relates to an information processing apparatus that anticipates the possibility that a vehicle equipped with a traveling battery might be stranded in standstill traffic and performs various processes.

Electric vehicles equipped with a traveling battery and capable of traveling without using fuel such as gasoline are becoming popular.

In such an electric vehicle, air conditioning of a cabin is performed with consumption of electric power stored in the traveling battery if heavy snowfall or the like brings the electric vehicle to a standstill. The air conditioning of the cabin of an electric vehicle tends to run for a shorter period of time than that of a gasoline-powered vehicle or the like.

A technique for predicting such a risk is disclosed in, for example, Japanese Unexamined Patent Application Publication (JP-A) No. 2020-126058.

SUMMARY

An aspect of the disclosure provides an information processing apparatus. The information processing apparatus includes one or more processors and one or more storage media storing a program to be executed by the one or more processors. The program includes one or more instructions. The one or more instructions cause the one or more processors to execute: acquiring information on a current location of a vehicle and a destination of the vehicle; acquiring one or more scheduled travel routes for reaching the destination from the current location; acquiring current weather information; predicting a standstill section that is a section in which a standstill situation is likely to occur on the one or more scheduled travel routes; predicting a standstill time that is a time during which a standstill situation occurs in the predicted standstill section; calculating heating power consumption due to use of heating over the predicted standstill time; performing a determination as to whether to additionally charge a traveling battery of the vehicle in accordance with the heating power consumption; and presenting information corresponding to a result of the determination.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
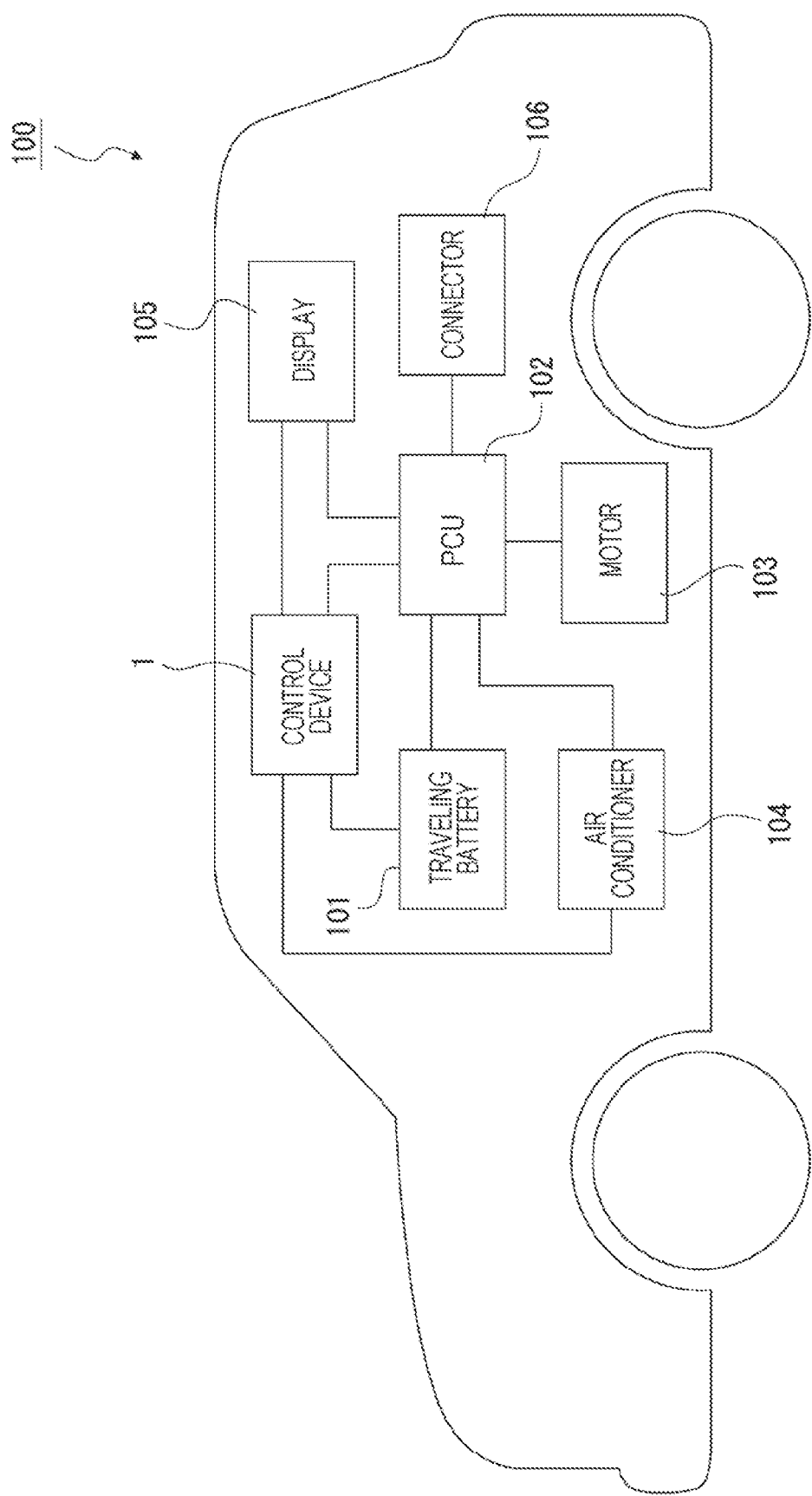
FIG. 1 is a schematic block diagram of a vehicle including a control device according to an embodiment of the disclosure.

In the technique disclosed in JP-A No. 2020-126058, a predictive risk calculator and an arrival probability calculator are used to acquire travel-related element information such as weather information and traffic congestion information, and the probability of non-arrival and an average value of electric efficiency for a travel route section are calculated based on the acquired travel-related element information.

In JP-A No. 2020-126058, the calculation of average electric efficiency and the like is also performed during smooth traveling. Accordingly, such information may be insufficient to provide a hedge against risk.

In addition, the same probability of non-arrival when presented to users may be interpreted differently by different users. Not all optimistic users take sufficient measures to hedge risks.

Accordingly, it is desirable to prepare for the occurrence of a standstill situation.

An information processing apparatus according to an embodiment of the disclosure will be described hereinafter with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The information processing apparatus according to the embodiment of the disclosure is applied to a control device 1 included in a vehicle 100. The control device 1 is an electronic control unit (ECU). The vehicle 100 is an electric vehicle. A configuration of the vehicle 100 is illustrated in FIG. 1.

The vehicle 100 includes a traveling battery 101, a power control unit (PCU) 102, a motor 103, an air conditioner 104, a display 105, a connector 106, and the control device 1.

FIG. 1 illustrates some of the components of the vehicle 100. The vehicle 100 includes a map locator, various sensors for driving the vehicle 100, a communication device, and so on, which are not illustrated in FIG. 1.

The traveling battery 101 is a high-voltage battery. The traveling battery 101 supplies electric power used for driving wheels of the vehicle 100, electric power used for operating the air conditioner 104 of the vehicle 100, and electric power used for operating other devices of the vehicle 100. In FIG. 1, the supply of electric power used for driving the wheels from the traveling battery 101 and the supply of electric power from the traveling battery 101 to the air conditioner 104 and the display 105 are illustrated, but the supply of electric power used for the operations of the other components is not illustrated.

The traveling battery 101 is charged based on a direct-current (DC) voltage supplied from the PCU 102.

The traveling battery 101 supplies a power supply voltage to the PCU 102 to drive the motor 103.

The PCU 102 includes an inverter, a DC-DC converter, and so on to drive the motor 103.

The PCU 102 generates an alternating-current (AC) current based on the supplied power supply voltage to drive the motor 103 and supplies the AC current to the motor 103. The PCU 102 controls the AC current to perform torque control of the motor 103. The PCU 102 may further have a regenerative braking function to optimize energy efficiency using regenerative energy.

The motor 103 is configured as a motor generator having an electric power generation function. The motor 103 drives the wheels based on the supplied AC current.

The air conditioner 104 includes components such as a compressor for compressing air, an expansion valve, and a blower fan, and an air-conditioning controller for controlling the components.

The air-conditioning controller controls the components of the air conditioner 104 to implement the function of cooling and heating the cabin of the vehicle 100. For example, the compressor and the expansion valve compress and expand refrigerant to cool and heat air by using a vapor compression refrigeration cycle.

The air-conditioning controller drives the compressor and the like in response to an operation or the like of an operator, and performs air-conditioning control to bring the temperature of the cabin of the vehicle 100 close to a set temperature.

The display 105 is generally representative of a multi-function display (MFD) installed in front of a driver who drives the vehicle 100 and other display devices for presenting information to the driver, for example.

The display 105 performs display based on detection signals detected by the various sensors included in the vehicle 100.

The display 105 appropriately displays various kinds of information such as a total travel distance of the vehicle 100, an outside air temperature, and instantaneous fuel efficiency.

The display 105 can also display map information, extracted route information, and so on.

In the present embodiment, the display 105 displays various indications to address the occurrence of a standstill situation. In one example, an indication for prompting a user to start the vehicle 100 after charging the vehicle 100 with electric power to be used when the vehicle 100 gets stranded in standstill traffic is displayed using the display 105. In another example, an indication for recommending to the user a route on which no standstill situation will occur is displayed using the display 105.

The connector 106 has a structure such that a charging plug included in a charging facility installed at home or in a charging station can be inserted into the connector 106. The connector 106 outputs an AC voltage supplied through the inserted charging plug to the PCU 102. The PCU 102 includes an AC-DC converter to convert the AC voltage to a DC voltage. The PCU 102 supplies the DC voltage to the traveling battery 101 to charge the traveling battery 101.

The control device 1 includes a central processing unit (CPU), a memory, and so on and performs overall control of the vehicle 100. The control device 1 may be configured as a single unit or may include ECUs. The ECUs may include various ECUs. Examples of such ECUs include a battery control ECU for performing charging control of the traveling battery 101, a display control ECU for performing display control of a display device (also including a meter or the like) included in the vehicle 100, an airbag control ECU, and an air-conditioning control ECU.

The control device 1 executes various programs stored in the memory or the like to implement various functions.

Figure 2:
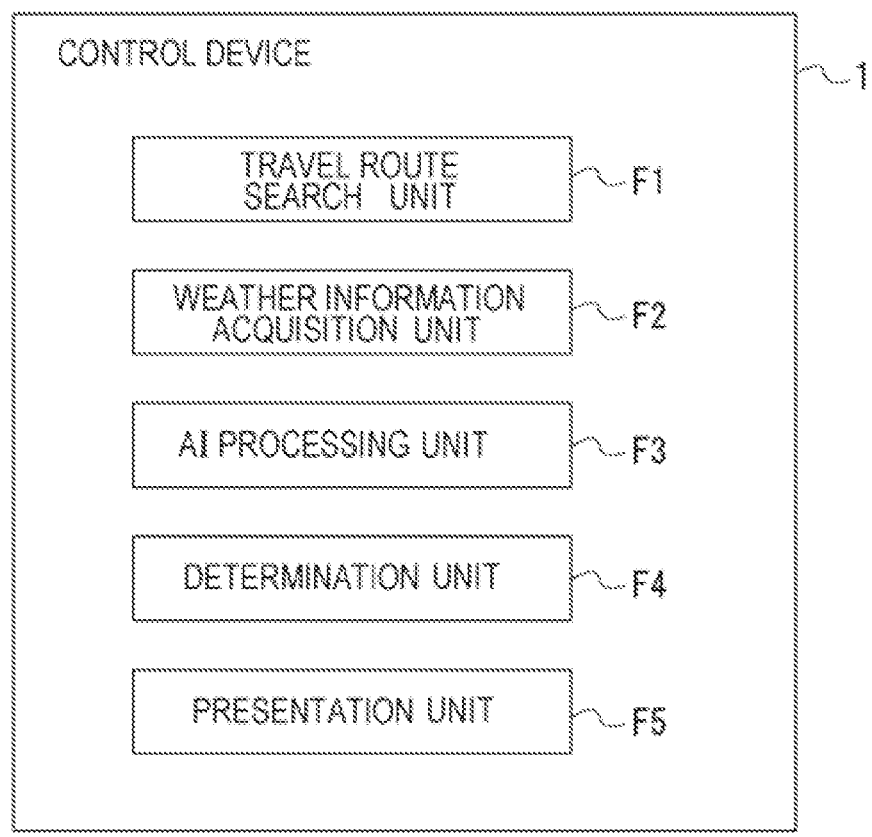
FIG. 2 is a diagram illustrating a configuration of the control device.

FIG. 2 illustrates an example of the configuration of control device 1 to implement the various functions.

The control device 1 includes a travel route search unit F1.

The travel route search unit F1 acquires current location information indicating the current location of the vehicle 100 and destination information indicating a destination selected by the user and searches for a route from the current location to the destination.

When multiple routes are obtained as a search result, the multiple routes are appropriately presented to the user with priorities assigned thereto in accordance with a predicted arrival time, a fee, and so on.

The control device 1 includes a weather information acquisition unit F2. The control device 1 acquires weather information of an area including at least a route extracted by a route search performed with the travel route search unit F1.

The weather information acquisition unit F2 acquires not only current weather information but also previous weather information and future forecasted weather information.

The weather information acquired by the weather information acquisition unit F2 includes, for example, information on a type of weather such as rainy, sunny, or snowy and its related information such as the amount of rainfall or snowfall. The weather information further includes information on a snowfall start time or an elapsed time from the snowfall start time, and outside air temperature information for the past, the present, or the future.

The control device 1 includes an artificial intelligence (AI) processing unit F3.

The AI processing unit F3 uses one or more AI models obtained by machine learning to obtain an inference result.

The AI processing unit F3 inputs a route extracted by the travel route search unit F1 to the AI models to obtain, for each travel route, electric power consumed during travel from the current location to the destination as an inference result. The electric power consumed during the travel is hereafter referred to as "travel power consumption".

The AI processing unit F3 may input information on a time period or a season, information on a wind speed such as a headwind or a tailwind, or the like to the AI models as input data to calculate a more accurate amount of power consumption.

The AI processing unit F3 inputs weather information such as the rate of snowfall at the time when snowfall starts and an elapsed time from the start of snowfall and route information to the AI models as input data. As a result, whether a standstill situation is likely to occur and, when a standstill situation occurs, the time taken to resolve the standstill situation (hereafter referred to as "time of being stranded") are obtained as inference results for each travel route.

Even for a travel route that passes through a section in which a standstill situation has previously occurred (hereafter referred to as a "standstill section"), an inference result that a standstill situation is not likely to occur is obtained if it is determined that the vehicle 100 has already passed through the standstill section in a time period during which a standstill situation is likely to occur.

The AI processing unit F3 inputs weather information, such as a temperature and a wind speed, and the time of being stranded described above to the AI models to obtain, for each travel route, as an inference result, electric power used for heating control using the air conditioner 104 while the vehicle 100 is traveling or is stranded in standstill traffic. This electric power is hereafter referred to as "heating power consumption".

Some of the inference results described above may be obtained without using the AI models.

The control device 1 includes a determination unit F4.

The determination unit F4 adds together the travel power consumption and the heating power consumption described above to calculate total power consumption. The determination unit F4 compares the total power consumption with the remaining battery capacity of the traveling battery 101 kept at an end-of-charge voltage to determine whether to make an alternative to a travel plan. The remaining battery capacity of the traveling battery 101 kept at an end-of-charge voltage is hereafter referred to as "total charge capacity".

A travel route for which the total power consumption is larger than the total charge capacity is a route for which it is likely that sufficient heating of the cabin is not allowed when snowfall brings traffic to a standstill in the standstill section.

For example, the determination unit F4 determines that an alternative plan is to be presented if the total power consumption is larger than the total charge capacity.

A proposal of an alternative to the travel plan is, for example, a proposal of a travel route that includes the standstill section and for which the total power consumption is smaller than the total charge capacity.

Other proposals of an alternative plan may include a proposal of a travel route that does not include the standstill section, and a proposal of changing the departure time of the vehicle 100.

The determination unit F4 compares the total power consumption with the current remaining battery capacity to determine whether additional charging before the departure is to be performed. The current remaining battery capacity is based on, for example, a state of charge (SOC) of the traveling battery 101. The SOC of the traveling battery 101 is calculated using measured values such as an output current value and an output voltage value of the traveling battery 101. The PCU 102 may manage information on the SOC, and the control device 1 may be capable of acquiring the SOC from the PCU 102.

For example, when the total power consumption is larger than the current remaining battery capacity, the determination unit F4 determines that additional charging before the departure is to be performed.

Alternatively, the determination unit F4 may determine whether the vehicle 100 is to stop at a charging station on the travel route on the basis of the total power consumption and the current remaining battery capacity.

The control device 1 includes a presentation unit F5.

The presentation unit F5 presents various kinds of information to the user on the basis of a determination result of the determination unit F4.

The presentation unit F5 presents a warning or the like to the user if a standstill situation is likely to occur.

If it is determined that an alternative plan is to be presented, the presentation unit F5 presents an extracted alternative plan to the user. Examples of the alternative plan include a change of the travel route and a change of the departure time, as described above.

When the total power consumption is larger than the current remaining battery capacity, a travel plan to stop at the nearest charging station before the standstill section on the travel route is reached may be presented.

The alternative plans described above may be generated by the travel route search unit F1, for example.

The AI processing unit F3 may calculate the time of being stranded from a graph instead of using the AI models.

Figure 3:
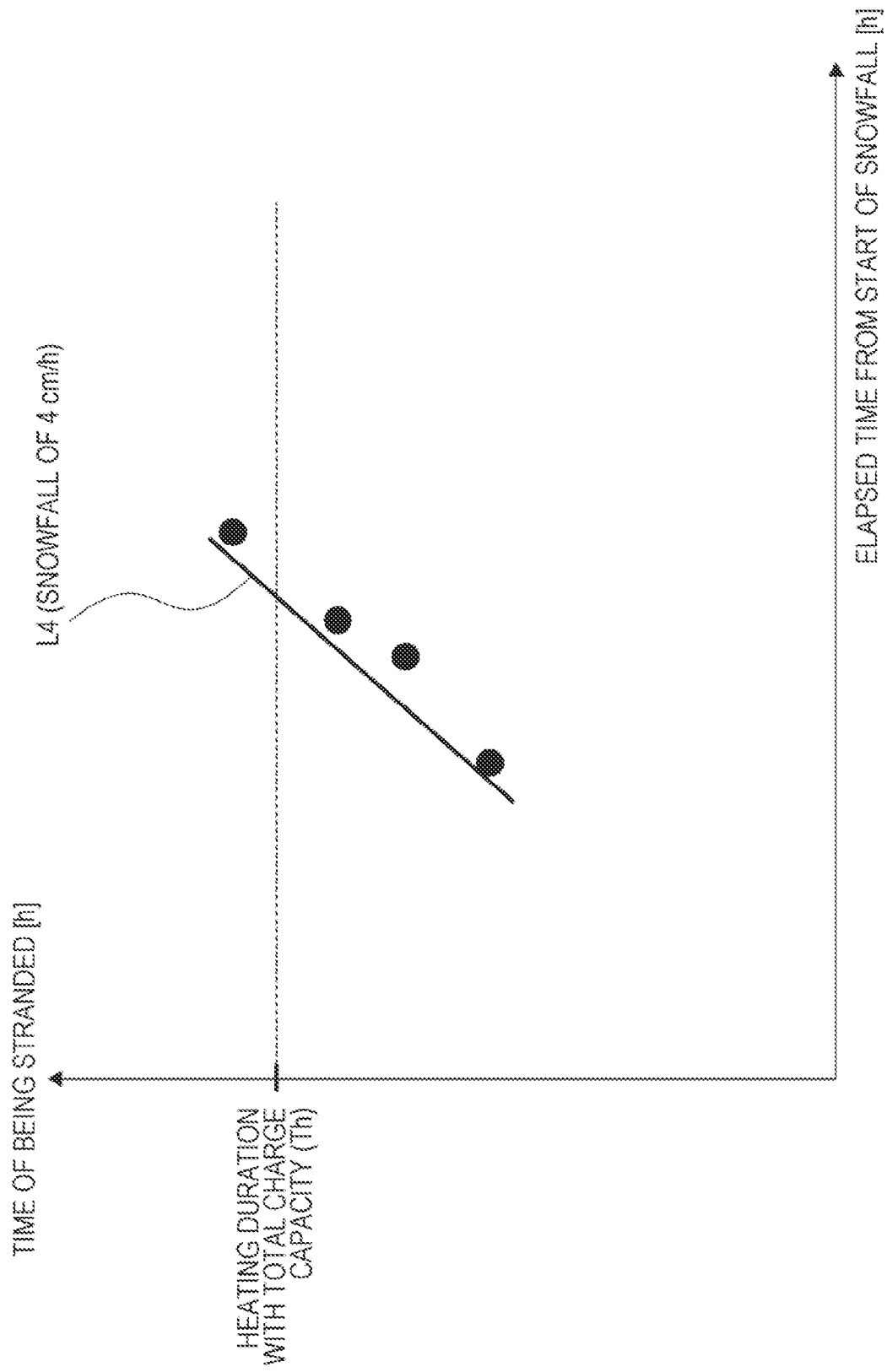
FIG. 3 is a diagram illustrating an example of a graph used to calculate a time of being stranded.

An example is illustrated in FIG. 3.

FIG. 3 is a graph for a certain standstill section. In the graph, the horizontal axis represents the elapsed time from the start of snowfall, and the vertical axis represents the time of being stranded. The graph illustrated in FIG. 3 is a graph obtained when the amount of snowfall per hour is 4 cm.

Each point plotted in the graph is data of a standstill event that has occurred previously in the certain standstill section, and indicates data for a snowfall of 4 cm/h.

An upward-sloping straight line near points on the graph is drawn with margins such that the points are located below the straight line. The straight line may be determined by moving an approximate straight line, which is calculated from the points, upward such that the points are located below the approximate straight line.

The straight line is calculated based on previous data for a snowfall of 4 cm/h, and is denoted by a straight line L4.

In the graph, a broken line indicating a "heating duration with the total charge capacity" is illustrated.

The heating duration with the total charge capacity is denoted by "threshold Th". The threshold Th is a measure of the duration of time of being stranded until the total charge capacity is used up in a standstill condition.

The threshold Th is determined based on surplus electric power obtained by subtracting, from the total charge capacity, the travel power consumption consumed until the destination is reached and electric power consumed due to the use of heating in a non-standstill condition.

In one example, the threshold Th is the time taken until surplus electric power maximized by fully charging the traveling battery 101 before the start of travel is completely consumed due to the use of heating in a standstill condition.

In other words, when the time of being stranded exceeds the threshold Th, the current total charge capacity of the traveling battery 101 is insufficient.

Figure 4:
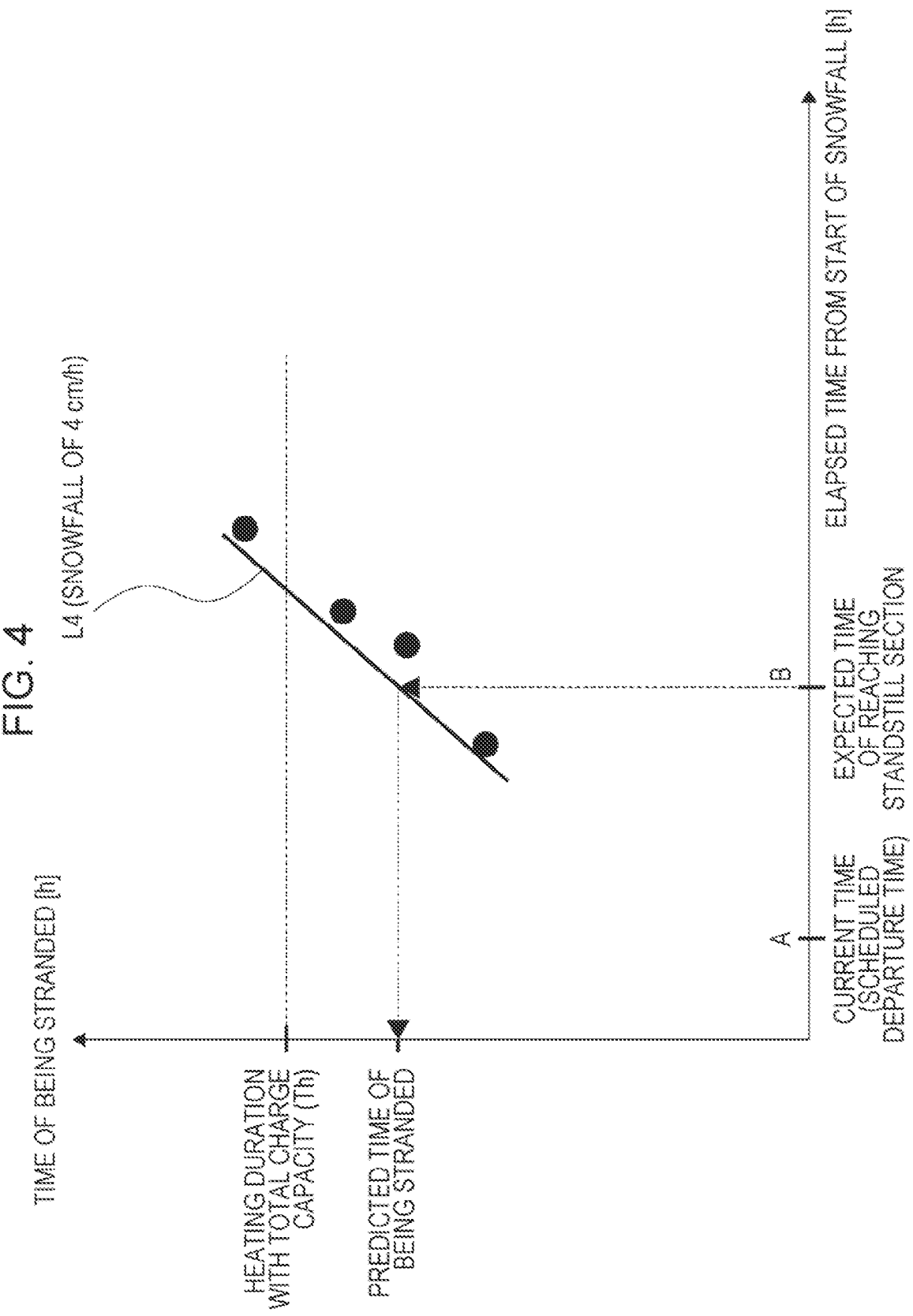
FIG. 4 is a diagram for explaining an example of a method of calculating the time of being stranded.

A method for predicting the time of being stranded from the graph in FIG. 3 is illustrated in FIG. 4.

First, an elapsed time from the start of snowfall to the current time is calculated, and a corresponding point A on the horizontal axis is determined. Then, the time taken to reach the standstill section from the current location is acquired, and a point B is determined such that the distance (time) from the point A on the horizontal axis is equal to the calculated time.

Data on the vertical axis at an intersection of a vertical line at the point B and the straight line L4 is read. The read data on the vertical axis represents a predicted time of being stranded.

When the predicted time of being stranded is lower than the threshold Th, it is indicated that the destination is reachable with the current total charge capacity of the traveling battery 101 after the lapse of the time of being stranded.

The graphs illustrated in FIG. 3 and FIG. 4 are based on the assumption of a snowfall of 4 cm/h.

Figure 5:
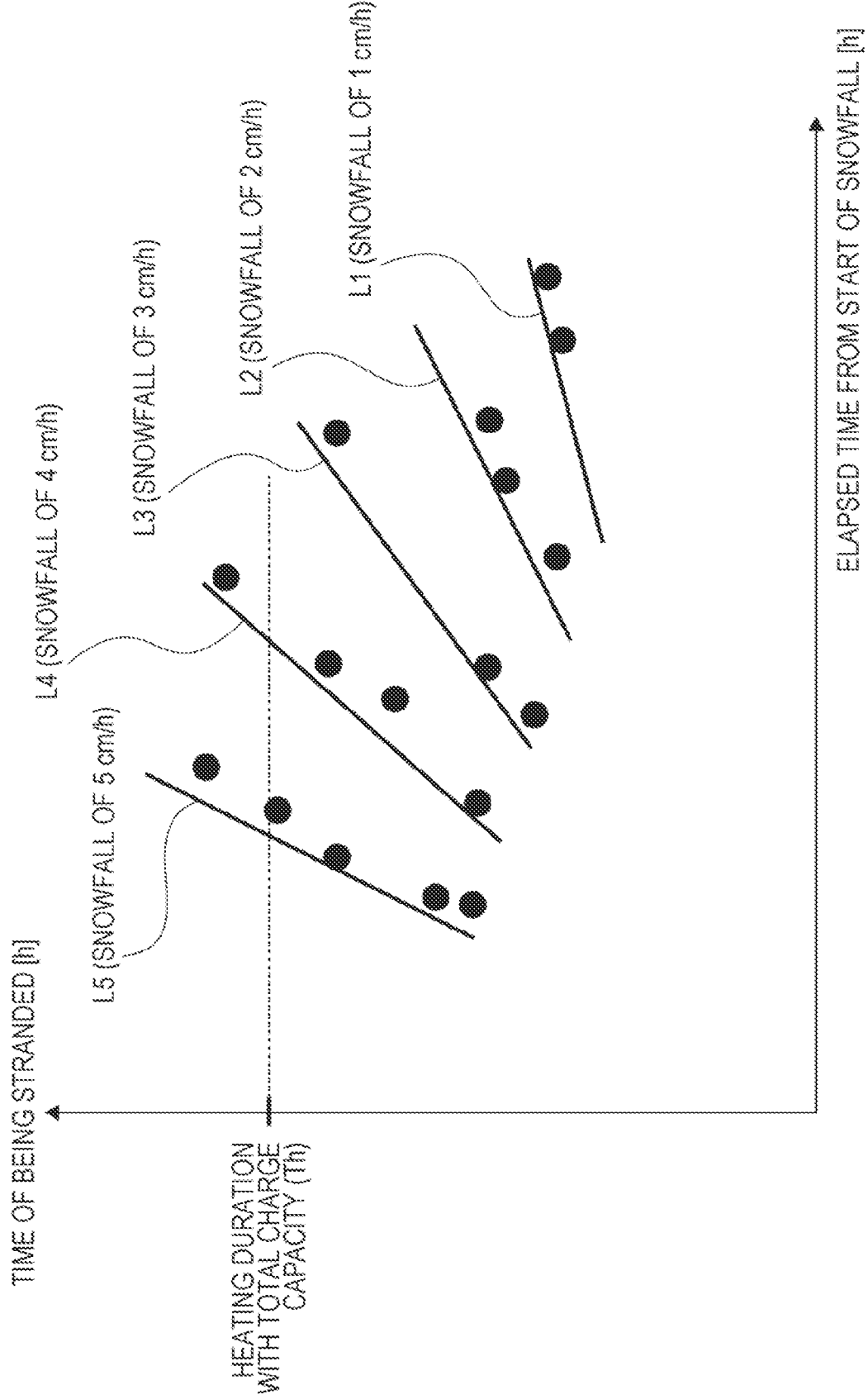
FIG. 5 is a diagram illustrating an example of a graph used to calculate the time of being stranded for each amount of snowfall.

FIG. 5 is a diagram illustrating cases of different amounts of snowfall.

In FIG. 5, five straight lines L1 to L5 are illustrated. The straight line L1 is a straight line to be referred to for a snowfall of 1 cm/h. Also, the straight line L2 is a straight line to be referred to for a snowfall of 2 cm/h, and the straight line L3 is a straight line to be referred to for a snowfall of 3 cm/h. Also, the straight line L4 is a straight line to be referred to for a snowfall of 4 cm/h, and the straight line L5 is a straight line to be referred to for a snowfall of 5 cm/h.

The straight line approaches being vertical as the amount of snowfall increases. This indicates that even if the elapsed time from the start of snowfall is short, a standstill situation is likely to occur and the time of being stranded is likely to be long.

The AI processing unit F3 or, instead of the AI processing unit F3, the control device 1 that calculates the time of being stranded without using the AI models acquires information on the amount of snowfall at the current time or the average amount of snowfall from the start of snowfall to the current time and selects a straight line to be referred to in FIG. 5.

Then, the control device 1 identifies, as the predicted time of being stranded, one point on the straight line selected using the snowfall start time, the current time, and the time taken to reach the standstill section.

As described above, the graph illustrated in FIG. 5 is for a single standstill section. In a case where the travel route can include multiple standstill sections, a graph similar to that illustrated in FIG. 5 is prepared for each standstill section.

Figure 6:
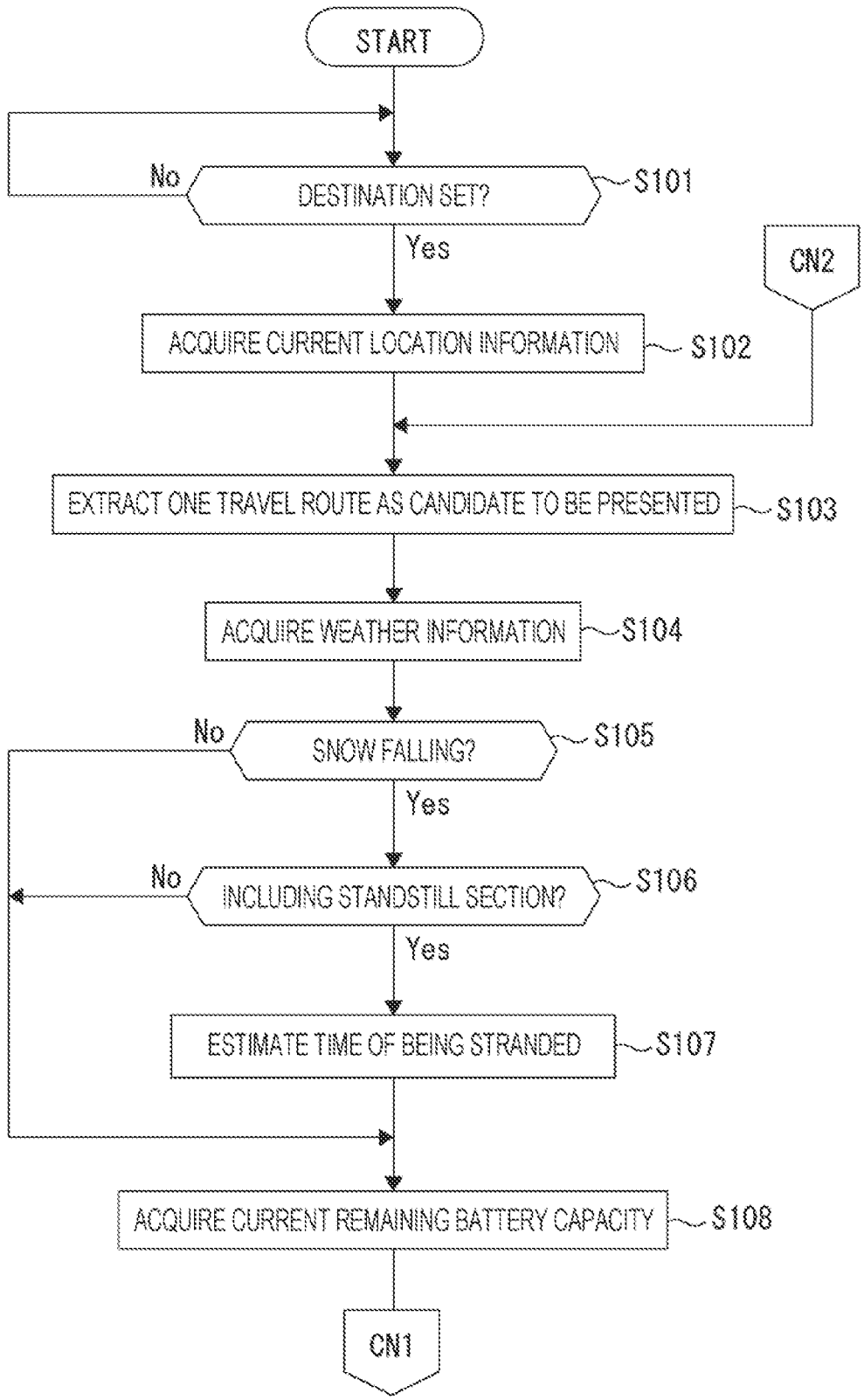
FIG. 6 is a flowchart illustrating an example of a process executed by the control device, which is continued on FIG. 7.
Figure 7:
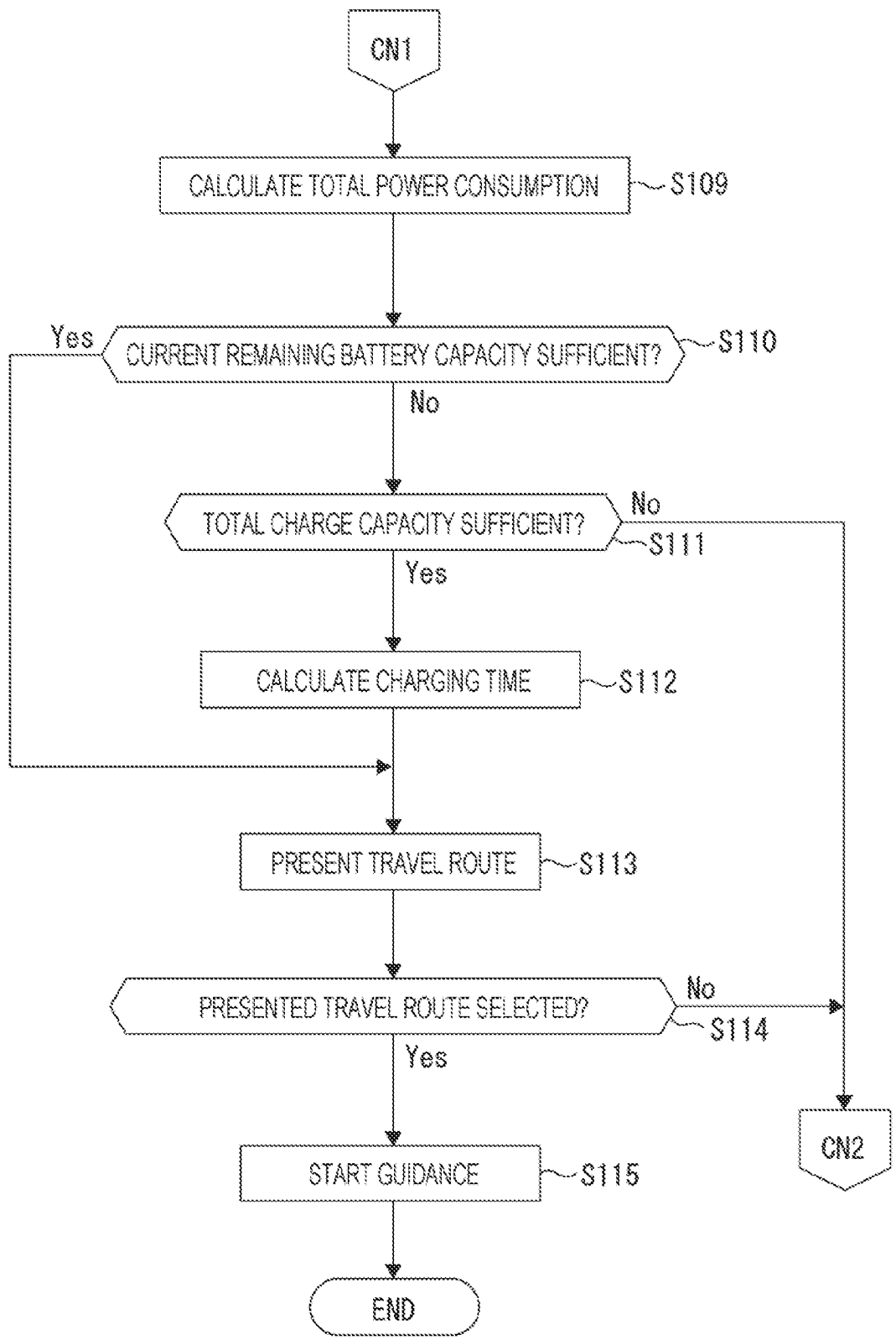
FIG. 7 is a flowchart continued from FIG. 6, illustrating the example of the process executed by the control device.

FIG. 6 and FIG. 7 illustrate an example of a process flow executed by an arithmetic processor such as the CPU included in the control device 1. In FIG. 6 and FIG. 7, connectors CN1 and CN2 are used to indicate links between processing operations.

In step S101, the control device 1 of the vehicle 100 determines whether a destination has been set. The setting of a destination is performed by, for example, the user operating a navigation system included in the vehicle 100.

If a destination has not been set, the control device 1 repeats the processing of step S101.

If it is determined that a destination has been set, then, in step S102, the control device 1 acquires the current location information of the vehicle 100. This processing is implemented by using, for example, a receiver for a global navigation satellite system (GNSS) included in the map locator of the vehicle 100 and a map database (DB) in which accurate map data is stored.

In step S103, the control device 1 extracts one travel route as a candidate to be presented. The extraction of a travel route may be performed in any way. For example, a travel route may be extracted in consideration of a travel distance, a travel time, the time taken to reach the destination, traffic congestion information, accident information, and so on.

In step S104, the control device 1 acquires weather information related to the extracted travel route. In this processing, for example, weather information concerning a prefecture or district including at least part of the travel route may be acquired. In another example, weather information based on an observation point located at a distance less than a predetermined distance from the travel route may be acquired.

In step S105, the control device 1 determines whether snow is currently falling. If it is determined that snow is not falling, the control device 1 skips the subsequent processing of step S106 and step S107.

If it is determined that snow is currently falling, then, in step S106, the control device 1 determines whether the travel route includes a standstill section.

If it is determined that the travel route does not include a standstill section, the control device 1 skips the processing of step S107.

On the other hand, if it is determined that the travel route includes a standstill section, then, in step S107, the control device 1 estimates a time of being stranded. The estimation of a time of being stranded is performed by, for example, using information such as the snowfall start time, the current time, and the time taken to reach the standstill section.

In step S105, instead of it being determined whether snow is currently falling, it may be determined whether the current amount of snowfall on the travel route is greater than or equal to a predetermined amount of snowfall on the basis of the information acquired in step S104. In one example, if the current amount of snow is greater than or equal to the predetermined amount of snow, "Yes" is determined in step S105.

In step S108, the control device 1 acquires the current remaining battery capacity of the vehicle 100.

In step S109 in FIG. 7, the control device 1 calculates total power consumption that is electric power consumed until the vehicle 100 reaches the destination when the vehicle 100 immediately departs from the current location.

In the calculation of the total power consumption, travel power consumption used for traveling the travel route and the heating power consumption due to heating during traveling are calculated and added together.

The calculation of the heating power consumption is performed by, for example, using information such as the time of passing through each point on the travel route and a predicted temperature at the time of passing through the point.

If the travel route includes a standstill section and a standstill situation is predicted, the heating power consumption is calculated also in consideration of the use of heating in the standstill situation.

In a case where a scheduled departure time has been set, in step S109, the control device 1 may calculate total power consumption that is electric power consumed until the vehicle 100 reaches the destination when the vehicle 100 departs at the scheduled departure time.

In step S110, the control device 1 acquires the current remaining battery capacity of the traveling battery 101 of the vehicle 100 and compares the current remaining battery capacity with the total power consumption to determine whether the current remaining battery capacity is sufficient.

If the total power consumption calculated in step S109 is less than the current remaining battery capacity, the control device 1 determines "Yes" in step S110. In this case, the control device 1 skips the processing of step S111 and step S112 and proceeds to the processing of step S113.

On the other hand, if the total power consumption calculated in step S109 is greater than or equal to the current remaining battery capacity, the control device 1 determines in step S110 that the current remaining battery capacity is insufficient, and proceeds to step S111.

In the determination processing of step S110, the determination may be made in consideration of a margin. For example, if the current remaining battery capacity does not exceed a determination value set to be higher than the total power consumption, "No" may be determined in step S110.

In step S111, the control device 1 compares the total charge capacity of the traveling battery 101 of the vehicle 100 with the total power consumption, and determines whether the remaining battery capacity at the time when the traveling battery 101 is fully charged is sufficient. In other words, if the total charge capacity is less than the total power consumption, "No" is determined in step S111 because the remaining battery capacity is determined to be insufficient even after the traveling battery 101 is charged.

If "No" is determined in step S111, the control device 1 returns to step S103 in FIG. 6, and extracts a new travel route as a candidate to be presented. In this case, it is determined that it is difficult to reach the destination when the current travel route is taken.

As illustrated in a modification described below, if "No" is determined in step S111, the control device 1 may determine whether an amount of electric power that exceeds the total power consumption can be secured by performing additional charging of the traveling battery 101 at a charging station present near the travel route.

If it is determined in step S111 that the total charge capacity exceeds the total power consumption, then, in step S112, the control device 1 calculates a charging time. In this processing, the control device 1 may calculate the charging time taken to fully charge the traveling battery 101, or may calculate the charging time taken to secure a remaining battery capacity that exceeds the total power consumption.

In step S113, the control device 1 presents a travel route.

In step S114, the control device 1 determines whether the presented travel route has been selected by the user.

If it is determined that the presented travel route has been selected, then, in step S115, the control device 1 starts guidance in accordance with the selected travel route.

On the other hand, if it is determined that the presented travel route has not been selected, for example, if the user gives an instruction to search for another travel route, the control device 1 returns to step S103 in FIG. 6 and extracts a new travel route as a candidate to be presented.

In a modification, processing performed after it is determined that the total power consumption is larger than the total charge capacity and the remaining battery capacity is insufficient even after the traveling battery 101 is charged is different from the processing described above.

For example, the processing will be described with reference to FIG. 8.

Figure 8:
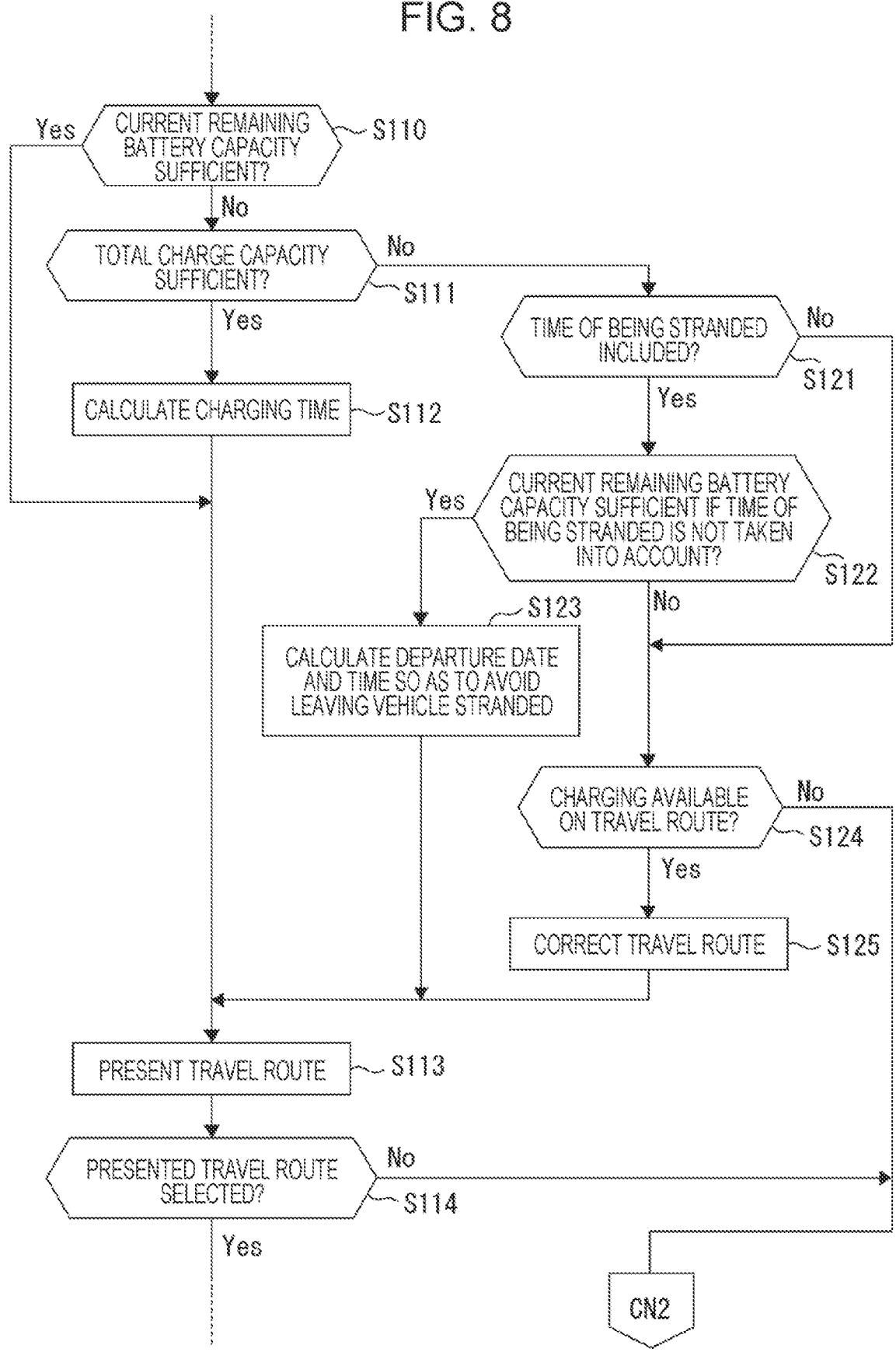
FIG. 8 is a flowchart illustrating a modification of the process executed by the control device.

The processing operations illustrated in FIG. 8 are executed after the processing of step S109 in FIG. 7 is performed. Processing operations similar to the processing operations illustrated in FIG. 7 are denoted by the same step numbers, and description thereof will be omitted as appropriate.

In step S110, the control device 1 determines whether the destination is reachable with the current remaining battery capacity of the traveling battery 101 of the vehicle 100.

If it is determined that the destination is reachable, the control device 1 proceeds to the processing of step S113 and step S114.

On the other hand, if it is determined that the destination is not reachable with the current remaining battery capacity, then, in step S111, the control device 1 compares the total charge capacity with the total power consumption, and determines whether the destination is reachable with full charging of the traveling battery 101.

If it is determined in step S111 that the total charge capacity exceeds the total power consumption, then, in step S112, the control device 1 calculates the charging time. Then, the control device 1 proceeds to the processing of step S113.

On the other hand, if it is determined in step S111 that the destination is reachable even with full charging of the traveling battery 101, then, in step S121, the control device 1 determines whether the time taken to reach the destination includes the time of being stranded. In other words, in the determination processing of step S121, the control device 1 determines whether a standstill situation is likely to occur.

If it is determined that a standstill situation is unlikely to occur (step S121: No), the control device 1 skips the processing of step S122 and proceeds to step S124.

On the other hand, if it is determined that a standstill situation is likely to occur (step S121: Yes), then, in step S122, the control device 1 determines whether the current remaining battery capacity is sufficient if the time of being stranded is not taken into account. In other words, in step S122, the control device 1 determines whether the travel power consumption and the heating power consumption during traveling can be covered by the current remaining battery capacity in a non-standstill condition.

If it is determined that the destination is reachable with the current remaining battery capacity in a non-standstill condition (step S122: Yes), then, in a step S123, the control device 1 calculates a departure time so as to avoid leaving the vehicle 100 stranded. In other words, the departure time is delayed so that the standstill section is reached at the time when the standstill situation is estimated to be resolved. In a case where a scheduled departure time has been set, the scheduled departure time may be advanced in the processing of step S123.

Then, in step S113, the control device 1 presents the travel route for which the departure time has been changed.

On the other hand, if it is determined in step S122 that the destination is not reachable with the current remaining battery capacity even in a non-standstill condition (step S122: No), then, in step S124, the control device 1 determines whether additional charging is available on the travel route. This determination processing is based on whether a charging station is located near the travel route, whether the charging station is reachable, and so on.

If it is determined that additional charging is not available on the travel route, the control device 1 returns to step S103 in FIG. 6, and extracts a new travel route as a candidate to be presented.

On the other hand, if it is determined that additional charging is available on the travel route, then, in step S125, the control device 1 corrects the travel route to stop at a charging station. Then, in step S113, the control device 1 presents the corrected travel route.

After correcting the travel route in step S125, the control device 1 may return to step S110 and perform various kinds of determination processing to check again whether the travel plan for traveling on the corrected travel route has an issue.

When the control device 1 returns to the processing of step S103 in FIG. 6 through the connector CN2 in FIG. 7 and FIG. 8, a search condition that no standstill section is included may be added.

As a result, in a route search performed in step S103 after returning from FIG. 7 and FIG. 8, a travel route that does not include a standstill section can be extracted as a candidate to be presented.

In the foregoing description, an information processing apparatus according to an embodiment of the disclosure is applied to a control device such as an ECU included in the vehicle 100. An information processing apparatus according to an embodiment of the disclosure may be applied to a server device disposed outside the vehicle 100.

Accordingly, an apparatus having a resource for arithmetic operations can be used to perform inference processing using an AI model. Thus, the accuracy of an inference result can be improved. In addition, retraining or the like is performed on an AI model each time a standstill event occurs, thus making it easy to use an updated AI model.

As described above, an ECU included in the vehicle 100 performs inference processing using an AI model, thereby making it possible to reduce the amount of communication between the vehicle 100 and another information processing apparatus. An influence of deterioration of a communication environment can thus be reduced.

In the processing of presenting information in step S113 described above, various travel routes may be presented. Examples of the presentation of such travel routes include presentation of a travel route in a case where a standstill situation or the like does not occur and the destination can be estimated to be reachable without any problem. Examples of the presentation of such travel routes further include presentation of a travel route for which the departure time is changed such that the vehicle 100 does not get stuck in standstill traffic, presentation of a travel route obtained as a result of a re-search such that the travel route does not include a standstill section, and presentation of a travel route for which the departure time is slightly delayed due to additional charging involved.

The travel routes and the departure time may not separately be presented as illustrated in FIG. 6 to FIG. 8.

For example, the processing operations of step S101 to step S112 may be repeated multiple times. In response to the number of combinations of travel routes and departure times that can be presented reaching a predetermined number, multiple proposals may be presented simultaneously in step S113.

A proposal appropriate for the user can be selected from the multiple proposals, resulting in improved convenience.

The control device 1 serving as an information processing apparatus according to an embodiment of the disclosure is a control device such as an ECU included in the vehicle 100. The control device 1 includes one or more processors and a storage medium storing a program to be executed by the one or more processors. The program includes one or more instructions. The one or more instructions cause the one or more processors to execute acquiring (steps S101 and S102) information on a current location of the vehicle 100 and a destination of the vehicle 100; acquiring (step S103) one or more scheduled travel routes (travel routes as candidates to be presented) for reaching the destination from the current location; and acquiring (step S104) current weather information.

Further, the one or more instructions cause the one or more processors to execute predicting (step S106) a standstill section that is a section in which a standstill situation is likely to occur on the one or more scheduled travel routes; predicting (step S107) a standstill time (amount of time of being stranded) that is a time during which a standstill situation occurs in the predicted standstill section; calculating (step S109) heating power consumption due to the use of heating over the predicted standstill time; performing a determination (steps S110 and S111) as to whether to additionally charge the traveling battery 101 in accordance with the heating power consumption; and presenting (step S113) information corresponding to a result of the determination.

In one example, in the process of presenting information in step S113, various travel routes may be presented. Examples of the presentation of such travel routes include presentation of a travel route in a case where a standstill situation or the like does not occur and the destination can be estimated to be reachable without any problem. Examples of the presentation of such travel routes further include presentation of a travel route for which the departure time is changed such that the vehicle 100 does not get stuck in standstill traffic, presentation of a travel route obtained as a result of a re-search such that the travel route does not include a standstill section, and presentation of a travel route for which the departure time is slightly delayed due to additional charging involved.

When the occurrence of a standstill situation is predicted, electric power consumed by the use of the air conditioner 104 in the standstill situation is calculated.

Accordingly, even if a standstill situation actually occurs, electric power consumed by the use of the air conditioner 104 for a period of time until the standstill situation is resolved can be secured. Occupant safety can be ensured.

As described above, the one or more instructions may cause the one or more processors included in the control device 1 to execute predicting (step S107) the standstill time (amount of time of being stranded), based on a relationship (the graph illustrated in FIG. 5) between the standstill time of a previous standstill situation that has occurred and an amount of snowfall in the previous standstill situation.

This configuration enables accurate prediction according to a standstill event that has occurred previously.

Further, the one or more instructions may cause the one or more processors included in the control device 1 to execute acquiring (step S108) a remaining battery capacity from the traveling battery 101; calculating (step S109) travel power consumption consumed during traveling on the one or more scheduled travel routes (travel routes as candidates to be presented); and presenting (step S113) a countermeasure plan when total power consumption obtained by adding together the travel power consumption and the heating power consumption exceeds a remaining battery capacity of the traveling battery 101 kept at an end-of-charge voltage (step S111: No).

This configuration makes it possible to address insufficient remaining battery capacity of the traveling battery 101 in a standstill condition.

Furthermore, the one or more instructions may cause the one or more processors included in the control device 1 to execute presenting (step S113) the countermeasure plan by presenting a scheduled travel route that does not include the standstill section among the one or more scheduled travel routes.

This configuration makes it possible to address a standstill situation and also makes it possible to propose not making the vehicle 100 encounter a standstill situation. Occupant safety can further be ensured.

Moreover, the one or more instructions may cause the one or more processors included in the control device 1 to execute presenting (step S113) the countermeasure plan by changing a departure time at which the vehicle 100 departs from the current location and presenting the changed departure time.

This configuration makes it possible to propose not making the vehicle 100 encounter a standstill situation. In addition, as described in the modifications, presentation of multiple plans in combination with the configuration described above allows the user to select a suitable plan in accordance with the situation, and convenience can be improved.

The examples and modifications described above may be combined as appropriate.

According to an embodiment of the disclosure, it is possible to prepare for the occurrence of a standstill situation.

In an embodiment of the disclosure, electric power consumed in a standstill condition is calculated.

The control device 1 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 1 including the travel route search unit F1, the weather information acquisition unit F2, the AI processing unit F3, the determination unit F4, and the presentation unit F5. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. An information processing apparatus comprising:
one or more processors; and
one or more storage media storing instructions causing the one or more processors to execute:
acquiring information on a current location of a vehicle and a destination of the vehicle;
acquiring one or more scheduled travel routes for reaching the destination from the current location;
acquiring current weather information;
predicting a standstill section, the standstill section being a section in which a standstill situation is likely to occur on the one or more scheduled travel routes;
predicting a standstill time based on a relationship between a standstill time of2 a previous standstill situation that has occurred and an amount of snowfall in the previous standstill situation, the standstill time being a time during which a standstill situation occurs in the predicted standstill section;
calculating heating power consumption due to use of heating over the predicted standstill time;
performing a determination as to whether to additionally charge a traveling battery of the vehicle in accordance with the heating power consumption; and
presenting information corresponding to a result of the determination.

2. An information processing apparatus comprising:
one or more processors; and
one or more storage media storing instructions causing the one or more processors to execute:
acquiring information on a current location of a vehicle and a destination of the vehicle;
acquiring one or more scheduled travel routes for reaching the destination from the current location;
acquiring current weather information;
predicting a standstill section, the standstill section being a section in which a standstill situation is likely to occur on the one or more scheduled travel routes;
predicting a standstill time, the standstill time being a time during which a standstill situation occurs in the predicted standstill section;
calculating heating power consumption due to use of heating over the predicted standstill time;
performing a determination as to whether to additionally charge a traveling battery of the vehicle in accordance with the heating power consumption;
presenting information corresponding to a result of the determination;
acquiring a remaining battery capacity from the traveling battery;
calculating travel power consumption consumed during traveling on the one or more scheduled travel routes; and
presenting a countermeasure plan when total power consumption exceeds a remaining battery capacity of the traveling battery kept at an end-of-charge voltage, the total power consumption being obtained by adding together the travel power consumption and the heating power consumption.

3. The information processing apparatus according to claim 1, wherein the one or more instructions cause the one or more processors to execute:
acquiring a remaining battery capacity from the traveling battery;
calculating travel power consumption consumed during traveling on the one or more scheduled travel routes; and
presenting a countermeasure plan when total power consumption exceeds a remaining battery capacity of the traveling battery kept at an end-of-charge voltage, the total power consumption being obtained by adding together the travel power consumption and the heating power consumption.

4. The information processing apparatus according to claim 2, wherein the one or more instructions cause the one or more processors to execute
presenting the countermeasure plan by presenting a scheduled travel route among the one or more scheduled travel routes, the scheduled travel route not including the standstill section.

5. The information processing apparatus according to claim 3, wherein the one or more instructions cause the one or more processors to execute
presenting the countermeasure plan by presenting a scheduled travel route among the one or more scheduled travel routes, the scheduled travel route not including the standstill section.

6. The information processing apparatus according to claim 2, wherein the one or more instructions cause the one or more processors to execute
presenting the countermeasure plan by changing a departure time at which the vehicle departs from the current location and presenting the changed departure time.

7. The information processing apparatus according to claim 3, wherein the one or more instructions cause the one or more processors to execute
presenting the countermeasure plan by changing a departure time at which the vehicle departs from the current location and presenting the changed departure time.

8. The information processing apparatus according to claim 1, wherein predicting the standstill section is executed in response to determining that there is snow falling on a traveling route of the vehicle based on the acquired current weather information.

9. The information processing apparatus according to claim 1, wherein predicting the standstill section is executed in response to determining that a current amount of snowfall on a traveling route of the vehicle is equal to or greater than a predetermined amount.

10. The information processing apparatus according to claim 2, wherein predicting the standstill section is executed in response to determining that there is snow falling on a traveling route of the vehicle based on the acquired current weather information.

11. The information processing apparatus according to claim 2, wherein predicting the standstill section is executed in response to determining that a current amount of snowfall on a traveling route of the vehicle is equal to or greater than a predetermined amount.

* * * * *